Patented Jan. 26, 1954

2,667,495

UNITED STATES PATENT OFFICE 2,667,495

ALKENYLATION OF THIOPHENES

Sam B. Becker, Chicago, Ill., assignor to Standard Oil Company, Chicago, Ill., a corporation of Indiana No Drawing. Application December 27, 1949, Serial No. 135,310

11 Claims. (Cl. 260—329)

This invention relates to the alkenylation of aromatic heterocyclic compounds having a sulfur atom in the heterocyclic ring. These compounds include thiophene, thiotolene, thioxenes, and thionaphthene and, in general, thiophene compounds having a hydrogen-substituted alpha carbon atom. The invention relates more particularly to the preparation of monoalkenyl thiophene and monoalkenyl substituted thiophenes by the catalyzed reaction of a thiophene of the above type with a conjugated diolefinic hydrocarbon.

As is well known, the 5-membered heterocyclic ring constituting thiophene is a relatively stable compound in which the carbon to sulfur bonds are the most readily broken. Consequently catalytic agents which would be effective to introduce a substituent for a hydrogen on the ring tend to decompose the compound and produce hydrogen sulfide and polymers. It is also known that the reactant diolefins, preferably conjugated diolefins, are readily polymerized in the presence of strong catalysts, such, for example, as sulfuric acid.

It is a primary object of the present invention to overcome these difficulties and provide a process of alkenylating thiophene and substituted derivatives thereof. Another object of the invention is the provision of a method for preparing monoalkenyl thiophenes and monoalkenyl substituted thiophenes. An additional object of the invention is to provide novel thienyl alkenes, particularly thienyl pentenes. The invention has for other objects such other advantages or results as will appear in the specification or the claims hereinafter made.

Briefly stated, the present invention comprises reacting thiophene or a substituted thiophene with a conjugated diolefin at temperatures less than about 0° C. and preferably at temperatures between −10° and −50° C. in the presence of at least 1%, by weight based on the thiophene compound, of a sulfonic acid catalyst. Preferably a molar excess of thiophene or thiophene derivative is employed. A molar excess of thiophene does not produce predominantly dithienyl alkanes by reaction with a diolefin as might be expected, but rather the monoalkenyl thiophene is produced in predominant yield. Contact of the diolefin and the sulfonic acid catalyst before admixture with the thiophene reactant should be avoided to prevent polymerization of the diolefin. Preferably the thiophene compound and the sulfonic acid are first mixed, at low temperature, and then the diolefin is slowly added to the mixture while cooling the same to remove exothermic heat of reaction. In one alternate method, a mixture of the thiophene compound and the conjugated diolefin can first be prepared and the sulfonic acid catalyst can be slowly added to the mixture. In another method, a mixture of the thiophene compound and the sulfonic acid is first prepared, at low temperature, and then is added to a mixture of the thiophene compound and the diolefin. The process can be effectively operated at atmospheric or superatmospheric pressures. The reaction appears to be substantially instantaneous but, in practice, the diolefin should be introduced slowly enough that cooling means of practicable capacity will be able to keep the reaction mixture below about 0° C. Thus reaction can be completed within about 5 to twenty minutes but if the cooling capacity is limited a reaction period of one-half to three hours can be employed.

The employment of a sulfonic acid as the alkenylation catalyst provides a substantial yield of the monoalkenyl thiophenes (thienyl alkenes) and avoids not only the polymerization of the employed conjugated diolefins which has heretofore been observed and is to be expected when strong acid condensation agents are to be employed, but also the decomposition or polymerization of the thiophene compound. The employment of alkanesulfonic acid having at most 5 carbon atoms per molecule provides an ease of separation of catalyst from the resulting alkenylated oils inasmuch as these acids are preferentially water soluble. Thus, I can employ methane-, ethane-, 1-propane, 2-propane, 1-butane, 2-butane, 2-methyl-2-propane or pentane-sulfonic acids or mixtures thereof, e. g., a commercially available mixture of $C_1$—$C_4$ alkanesulfonic acids. I can also employ higher alkanesulfonic acids such as octane, decane, dodecane-sulfonic acids and the like. I can also employ aromatic sulfonic acids such as benzene-, toluene-, xylene-, naphthalene-sulfonic acids and the like. Other sulfonic acids available for use in the practice of my invention are cycloalkyl sulfonic acids, such as cyclohexanesulfonic acid, methylcyclohexane-sulfonic acids and the like. Aralkyl-sulfonic acids, such as benzylsulfonic, beta-phenethyl sulfonic acids and the like can also be used.

Diolefins particularly suitable in the present reaction include those conjugated diolefins having at most 6 carbon atoms per molecule such, for example, as 1,3-butadiene, isoprene, piperylene, 2,3-dimethylbutadiene, cyclopentadiene, methylcyclopentadiene, 1,3-cyclohexadiene and 2, chloro-1,3-butadiene. As aforementioned the thiophene compounds can include thiophene, $C_4H_4S$, thiotolene, $C_5H_6S$, the thioxenes, $C_6H_8S$ and thionaphthene (benzothiophene), $C_8H_6S$. In the case of the thioxenes, those isomers in which an alpha carbon atom is available to the alkenylation reaction provide better yields and thus are preferred in the process.

Thiophene, the leading member of the heterocyclic series, is found in small quantities in coke oven light oil and can be prepared by reaction at about 600° C. between butane, such as that obtained from the $C_4$ cut from petroleum cracking processes, and sulfur. Butene, butadiene, thiophene, and hydrogen sulfide are the products of this reaction. Butadiene can be produced in varying relative quantities of from about one-half to one mol per mol of thiophene, and is available for alkenylating the thiophene by the catalyzed process of the present invention.

Under reaction conditions about 1% of sulfonic acid by weight based on the reactant heterocyclic sulfur compound is required to effect reaction. Amounts of catalyst above 50% by weight based on the heterocyclic reactant effect no increase in catalysis and at higher concentrations undesirable side reactions may be encountered. A preferred range of catalyst concentration is from 1 to 20% of sulfonic acid by weight, based on the heterocyclic sulfur compound. In spite of the known tendency of strong acid condensation agents to effect polymerization, the above concentrations of the sulfonic acids, either as chemical individuals or as mixture of the acids, result in substantial production of monoalkenyl thiophenes.

The following specific example is illustrative of the alkenylation process.

While maintaining the reactants at the low temperature of between —30° and —40° C., one mol of isoprene was added over a period of three hours to three mols of thiophene with which there had previously been mixed 40 milliliters of mixed alkanesulfonic acids. The catalyst acids consisted of a mixture of methane-, ethane-, propane-, and some butanesulfonic acids. The resulting product was neutralized and steam distilled to decompose any esters of the alkanesulfonic acids that may have formed.

A 48.5 per cent yield, based on the theoretical yield, of isopentenyl thiophene (thienyl methyl butene), $n_D^{20}=1.5262$, was obtained. The molecular weight of the isopentenyl thiophene was determined by the mass spectrometer method to be 152 which is the theoretical value. The mass spectrum observation provided no evidence to indicate the presence of compounds of any other molecular weight in the separated product. About 10% of a polymeric material was obtained as a residue.

When the test was performed with the identical reactants, the same reactant proportions, and time but a temperature between 10° and 20° C., substantially the entire product consisted of a polymer having a molecular weight of 404.

Further runs demonstrated that at room temperature an alkanesulfonic acid is a catalyst for the polymerization of pentenyl thiophenes.

The thienyl alkenes are useful in the preparation of copolymers, in esterification processes and as organic intermediates.

I claim:

1. The process of preparing thienyl alkenes that comprises reacting thiophene and a conjugated diolefin having at most 6 carbon atoms per molecule at a temperature less than about 0° C. in the presence of at least about 1 per cent by weight based on the thiophene, of a non-olefinic hydrocarbon sulfonic acid catalyst.

2. The process of alkenylating thiophene that comprises admixing the said thiophene, a conjugated diolefinic hydrocarbon having at most 6 carbon atoms per molecule, and at least about 1 per cent, by weight based on the thiophene compound, of an alkanesulfonic acid catalyst while avoiding bringing diolefin and catalyst into contact in the absence of the thiophene compound and maintaining the admixed thiophene compound and diolefin at a temperature below about 0° C. while effecting reaction therebetween.

3. The process of preparing thienyl alkenes comprising passing a conjugated diolefinic hydrocarbon having at most 6 carbon atoms per molecule into a molar excess of thiophene containing between 5 and 50% by weight thereof of an alkanesulfonic acid catalyst having not more than five carbon atoms per molecule at a temperature between about —10° C. and about —50° C. for a period of time sufficient to effect substantial completion of reaction between the thiophene and diolefin, separating liquid product from the catalyst, and recovering a thienyl alkene from the product.

4. The process of claim 3 in which the conjugated diolefinic hydrocarbon is butadiene.

5. The process of claim 3 in which the conjugated diolefinic hydrocarbon is isoprene.

6. In the process for preparing thienyl alkenes by reaction of a thiophene compound having a hydrogen-substituted alpha carbon atom with a conjugated diolefin having at most 6 carbon atoms per molecule, the improvement which comprises effecting said reaction in the presence of at least about 1 weight percent, based on said thiophene compound, of an alkanesulfonic acid while maintaining the reaction temperature below about 0° C.

7. The process of claim 6 wherein said reaction temperature is between about —10° C. and about —50° C.

8. In the process for preparing thienyl alkenes by reaction of a thiophene compound having a hydrogen-substituted alpha carbon atom with a conjugated diolefin having at most 6 carbon atoms per molecule, the improvement which comprises effecting said reaction in the presence of at least about 1 weight percent, based on said thiophene compound, of an alkanesulfonic acid containing 1 to 5 carbon atoms, inclusive, per molecule while maintaining the reaction temperature below about 0° C.

9. The process of claim 8 wherein said thiophene compound is thiophene.

10. The process of claim 8 wherein said thiophene compound is thiophene and said diolefin is 1,3-butadiene.

11. The process of claim 8 wherein said thiophene compound is thiophene and said diolefin is isoprene.

SAM B. BECKER.

References Cited in the file of this patent

UNITED STATES PATENTS

| Number | Name | Date |
|---|---|---|
| 2,141,611 | Malishev | Dec. 27, 1938 |
| 2,396,144 | Anderson | Mar. 5, 1946 |
| 2,462,793 | Lee | Feb. 22, 1949 |
| 2,564,077 | Proell | Aug. 14, 1951 |

OTHER REFERENCES

Richter, Organic Chemistry, pp. 649–650, Wiley, N. Y., 1938.